JOHN T. McNAMEE.
Improvement in Coffee-Pots.
No. 115,080.          Fig. 1.          Patented May 23, 1871.
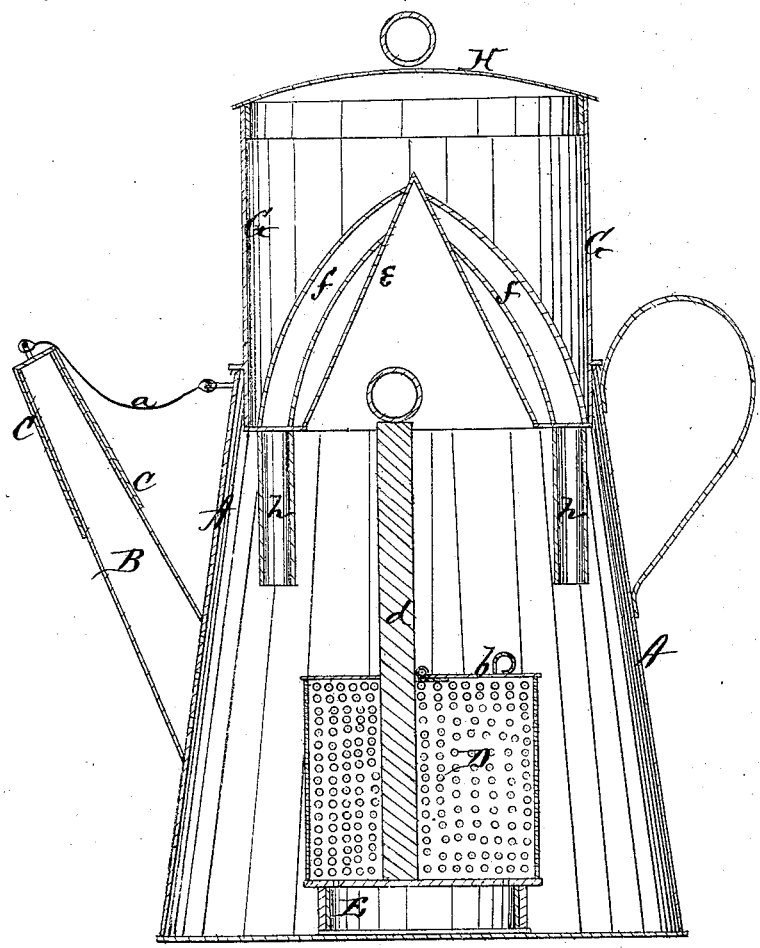
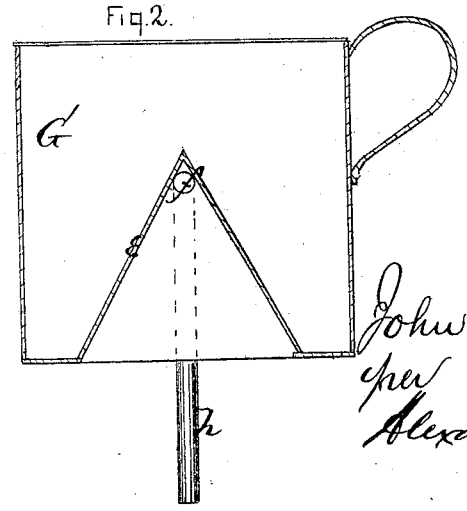
Witnesses.                                   Inventor.

UNITED STATES PATENT OFFICE.

JOHN T. McNAMEE, OF BALTIMORE, MARYLAND, ASSIGNOR OF ONE-HALF HIS RIGHT TO JACOB L. SCHOCH, OF SAME PLACE.

IMPROVEMENT IN COFFEE-POTS.

Specification forming part of Letters Patent No. 115,080, dated May 23, 1871.

*To all whom it may concern:*

Be it known that I, JOHN T. MCNAMEE, of Baltimore, in the county of Baltimore and in the State of Maryland, have invented certain new and useful Improvements in Coffee-Pots; and do hereby declare that the following is a full, clear, and exact description thereof, reference being had to the accompanying drawing and to the letters of reference marked thereon making a part of this specification.

The nature of my invention consists in the construction and arrangement of a strainer and of a condenser used with a coffee-pot, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of a coffee-pot with my strainer and condenser, and Fig. 2 is a transverse vertical section of the condenser.

A represents a coffee-pot of any desired size and construction, provided with the usual spout B, over the end of which is placed a cap, C. This cap is connected with the pot by a chain, $a$, and is to be placed over the spout while making the coffee, so that the steam cannot escape. D represents the strainer, made in the shape of a cylinder, of perforated sheet metal, with a lid, $b$, in the top. The bottom of the strainer D is also perforated; and attached to the same, on the under side, is a removable cup, E, which forms the foot of the strainer. $d$ is a rod or handle attached to the strainer, by means of which it is removed from the pot and put in again, as desired. The ground coffee is placed inside of the strainer D, and all the fine dust and sediment settles down into the cup E instead of coming out through the sides of the strainer, thus insuring perfectly clear coffee, free from all sediment. In the top of the pot A is inserted the condenser G, made in the shape of a tin cup, with the bottom $e$ made conical or in the shape of an inverted funnel, as shown. The apex of the cone extends to any suitable height within the cup G. From the apex of the cone $e$ two or more tubes, $ff$, lead outward and downward through the bottom of the condenser, terminating in tapering pipes $hh$ within the pot, as shown in Fig. 1. The condenser G is covered by a lid, H, which will also fit the top of the coffee-pot when the condenser is removed.

When the coffee boils the condenser G should be filled with cold water, so that when the steam from the coffee rises into the cone $e$ and passes into the tubes $ff$ it will be condensed and in the form of liquid return to the coffee-pot, thus retaining all the flavor or aroma of the coffee, as none can pass out.

Having thus fully described my invention, what I claim as new, and desire to secure by Letters Patent, is—

1. The condenser G, with conical bottom $e$ and pipes $ff$ and $hh$, all substantially as and for the purposes herein set forth.

2. The combination of a coffee-pot, A, with spout B and cap C, the strainer D with sediment-cup E, and the condenser G with conical bottom $e$ and tubes $ff$ and $hh$, all substantially as and for the purposes herein set forth.

In testimony that I claim the foregoing I have hereunto set my hand this 9th day of March, 1872.

TOHN T. McNAMEE.

Witnesses:
M. P. SCHOCH,
SAMUEL JARDEN.